(12) United States Patent
Greenwood et al.

(10) Patent No.: US 6,211,777 B1
(45) Date of Patent: Apr. 3, 2001

(54) SYSTEM AND METHOD FOR AUTOMATIC INFORMATION EXCHANGE BETWEEN VEHICLES INVOLVED IN A COLLISION

(75) Inventors: Michael Corey Greenwood, Holmes; Te-Kai Liu, Elmsford, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/201,192

(22) Filed: Nov. 30, 1998

(51) Int. Cl.⁷ ....................................................... B60Q 1/00
(52) U.S. Cl. ........................ 340/436; 180/272; 235/384; 340/438
(58) Field of Search ..................................... 340/436, 438, 340/961, 825.69, 825.72, 425.5, 901, 902, 905; 280/735; 180/272; 342/457; 235/384; 701/117

(56) References Cited

U.S. PATENT DOCUMENTS

| 4,638,289 | * | 1/1987 | Zottnik | 340/436 |
|---|---|---|---|---|
| 5,311,197 | * | 5/1994 | Sorden et al. | 342/457 |
| 5,483,442 | * | 1/1996 | Black et al. | 364/400 |
| 5,910,766 | * | 6/1999 | Evans | 340/539 |
| 5,969,598 | * | 10/1999 | Kimura | 340/436 |
| 6,012,012 | * | 1/2000 | Fleck et al. | 701/117 |

* cited by examiner

*Primary Examiner*—Brent A. Swarthout
(74) *Attorney, Agent, or Firm*—Douglas W. Cameron; Anne Vachon Dougherty

(57) ABSTRACT

A method for exchanging information between vehicles involved in or near a collision site. When a collision is sensed by one vehicle, a message is transmitted from the one vehicle to at least one of the other vehicles within a threshold distance of the one vehicle. The message contains at least the identity of the one vehicle and preferably driver information, insurance information, along with the time and place of the collision.

18 Claims, 3 Drawing Sheets

SYSTEM AND METHOD FOR AUTOMATIC INFORMATION EXCHANGE BETWEEN VEHICLES INVOLVED IN A COLLISION

DESCRIPTION

Field of the Invention

This invention relates to mobile wireless communication, and more specifically to a method for automatically exchanging information between vehicles involved in a collision or near a collision site.

BACKGROUND OF THE INVENTION

The current law requires drivers involved in a collision exchange insurance information and get witness if possible. Typically this is done by paper and pen, which is both time consuming and error prone. Sometimes drivers may not have their insurance information available at the scene of incidents. Sometimes drivers may even try to escape from the scene to avoid liability.

Collision detection and automatic notification systems already exist in the prior art, for example OnStar from General Motor [1], MP200-GPS from Sierra Wireless [2], and Placer 450 from Trimble [3]. These systems deliver notification to a central station with a preprogrammed number stored in the in-vehicle device via vehicle-to-infrastructure communications. The problem with these solutions is that they do not allow vehicles to exchange information and that they require vehicles in the communication range of cellular network infrastructure.

BRIEF SUMMARY OF THE INVENTION

This present invention discloses a method which can automatically collect the other party's information and find witness at the scene of incidents without human intervention, thus greatly reducing the possibility of transcription error and hit-and-run.

This invention requires an automobile to be equipped a device of the following characteristics. First, the device needs wireless communication capability which can transmit/receive packets to/from the air. Second, the device needs some storage capability which can store the driver's information (e.g. name and driver license number), the vehicle's information (e.g., vehicle identification number and license plate number) and the driver's insurance information (e.g., insurance company name, policy number, and phone number.) Third, the device needs a sensor which can determine whether or not the vehicle is involved in a collision.

The basic sequence of events that will happen in a incident involving two vehicles equipped with the aforementioned device is described as follows. The sequence of events for the case of a multi-vehicle incident can be derived easily. Upon the collision sensors in both vehicles detect a collision, the in-vehicle device will broadcast its information over a radio channel and also try to receive the information from the other party.

The information to be exchanged can be tagged with the time and location when a collision is detected so that exchanging information are confined within vehicles involved in the same collision. The time and location information can be obtained, for example, by Global Position Systems (GPS).

In order to be sure that the information received is truly originated from the sender, the message sender has to digitally sign the message using a cryptosystem known in the prior art. Digital signatures can also prevent the receiving party from tampering with the received information. The broadcast information can also be encrypted by the public key of a trusted third party such as the police department or DMV (department of motor vehicles). In such a case, the receiving party has to work with the trusted third party to decrypt the received information.

The nature, principle and utility of the invention will become more apparent from the following detailed description when read in conjunction with the accompanying drawings.

DETAILED DESCRIPTION OF THE PREFERRED EMBODIMENT

Preferred embodiment of this invention will be described with reference to the accompanying drawings.

Figure 1:
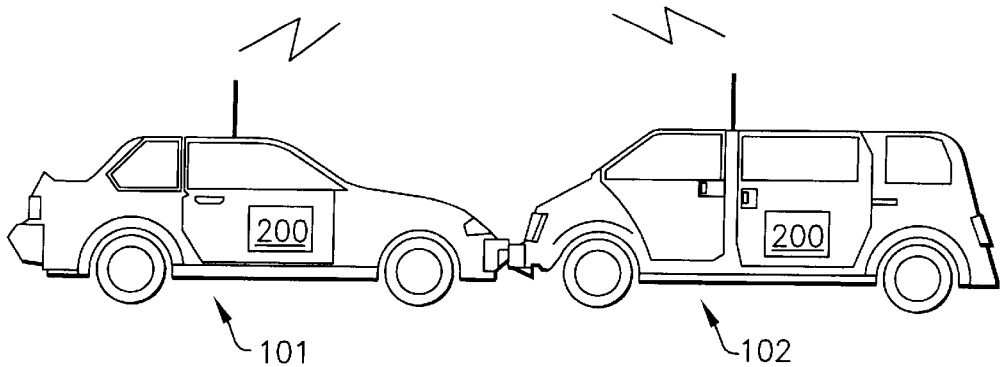
FIG. 1 shows a collision involving two vehicles which exploit the present invention to automatically exchange information.

FIG. 1 shows a collision involving two vehicles 101 and 102 which exploit the present invention 200 to automatically exchange information.

Figure 2:
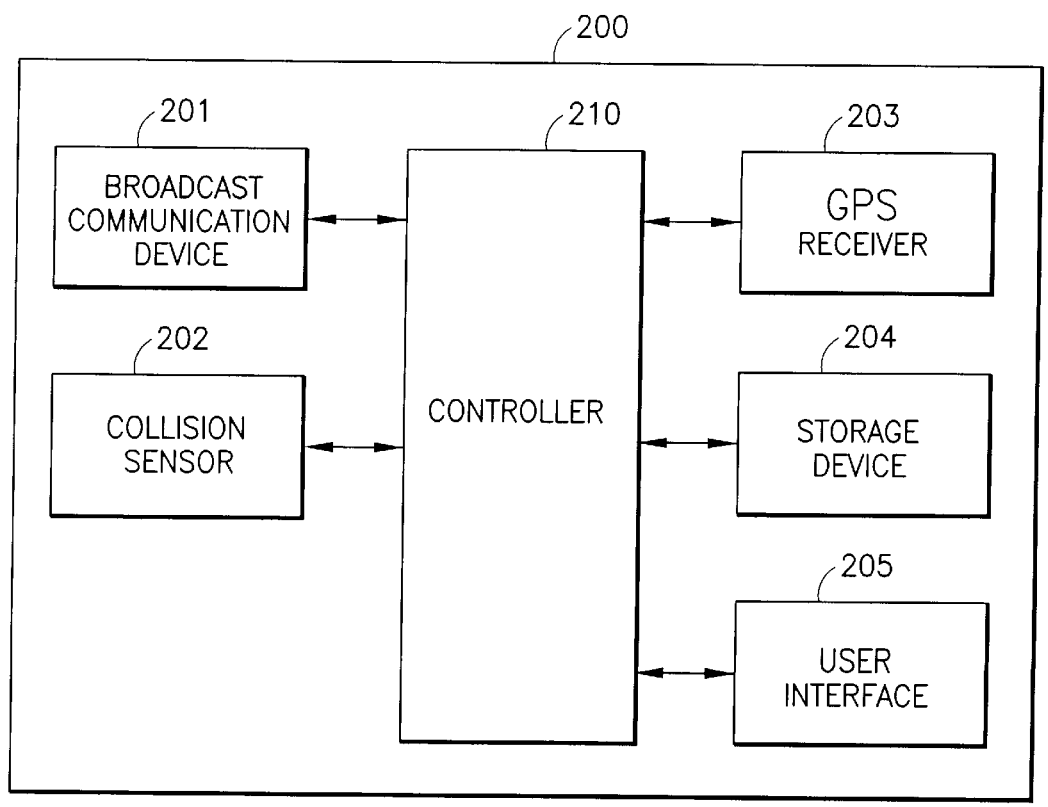
FIG. 2 is a block diagram showing the functional modules of the in-vehicle device according to the present invention.

FIG. 2 is a block diagram showing the functional modules of the in-vehicle device 200 in FIG. 1. The in-vehicle device 200 includes a controller 210 which is connected to a broadcast communication device 201, a collision sensor 202, a GPS (Global Positioning System) receiver 203, a storage device 204 and an input/output (I/O) device 205. The controller 210 can send and receive messages over a broadcast channel using the broadcast communication device 201. For the cost reasons, the broadcast communication device 201 is half-duplex, which means that the device can transmit and receive but not simultaneously. The collision sensor 202 can monitor the activity of the vehicle and notify the controller 210 when it detects that the vehicle is involved in a collision. The GPS receiver 203 can provide the controller 210 with the location of the vehicle in terms of longitude/latitude/altitude coordinates within the accuracy of the GPS system. The storage device 204 stores the information about the driver, the vehicle, the insurance company, and the messages sent and received by the controller 210. The user interface 205 is for the driver or other persons to interact with the in-vehicle device and to access the information stored in the storage device 204.

The in-vehicle device can be implemented by two embodiments. Which one is preferable depends on whether the in-vehicle device has to perform tasks other than the ones being described, i.e. automatic information exchange upon collision.

In the case where the user interface 205 is a microphone, the controller 210 of the in-vehicle device is a PC with sufficiently high processing power such that it can perform tasks such as speech recognition, text-to-speech conversion, audio equipment control, internet access, etc. An example is the Clarion AutoPC. The controller 210 is also programmed to implement the flowcharts shown in FIGS. 3–4 and includes device drivers to control the broadcast communication device 201, the collision sensor 202, the GPS receiver 203, the storage device 204, and the user interface 205. With the standard Universal Serial Bus (USB) support in the AutoPC, the broadcast communication device 201, the collision sensors 202, the GPS receiver 203, the storage device 204 and the user interface 205 can all be connected to the controller 210 by the USB.

The broadcast communication device 201 can be a radio modem that operates in the unlicensed ISM band (902–928 MHz). It can comply with the IEEE 802.11 wireless local area network (LAN) standard or implement other wireless LAN protocol (such as Ricochet modem [4]) as long as their transmission power is lower than 30 dBm (1 Watt) as regulated by FCC Part 15 Ruling. The collision sensor 202 can be implemented, for example, by commercially available sensors which detect collision based on change of inertia [5] and acceleration [6], or other devices which react to changes in contact pressure [7]. Typically these sensors have a digital output (e.g. CMOS or TTL) which produces a voltage pulse when they are triggered by a collision. Reference books such as [8] and [9] teach how to develop circuits and codes to implement the serial communication interface between a computer and a peripheral device. The GPS receiver 203 connected to the controller 210 will receive GPS satellite signals and inform the controller 210 as to the position of the vehicle and the current time. The GPS receiver 203 can be obtained off-the shelf. The storage device 204 can be implemented using, for example, a flash memory. The user interface 205 could be a display with a speaker and a keyboard.

In another embodiment, the controller 210 is a low-cost microprocessor which only implements the functions required to realize the present invention. The interface between the controller 210 and the peripheral devices (201, 202, 203, 204, 205) can be chosen from digital bus standards such as PCI, PCMCIA, USB, etc.

Figure 3:
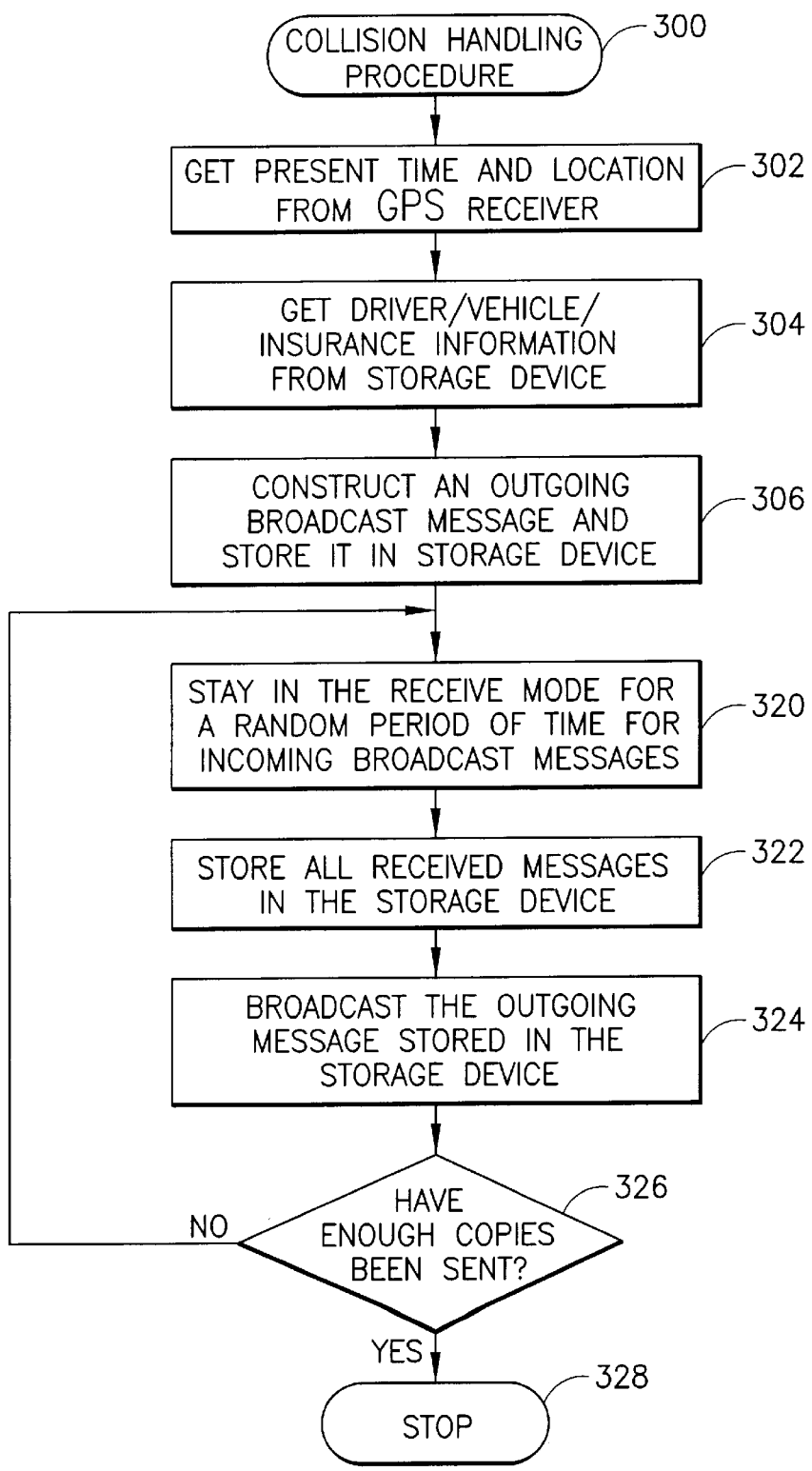
FIG. 3 is a flowchart for the collision handling procedure executed by the controller when the collision sensor is triggered.

Regardless of which embodiment is used, a collision handling procedure will be executed by the controller 210 when the collision sensor 202 detects a collision event and notifies the controller 210. FIG. 3 is a flowchart for the collision handling procedure 300 executed by the controller when the collision sensor is triggered. The controller 210 first gets the present time and location of the vehicle from the GPS receiver 203 in step 302. The controller further gets the information about the driver (e.g., driver license number), the vehicle (e.g., vehicle identification number, license plate number, etc.) and the insurance company (e.g., company name, phone number, policy number, etc.) from the storage device 204 in step 304. The controller 210 then constructs an outgoing message containing the aforementioned information and stores the outgoing message in the storage device 204 in step 306. The controller 210 then enters a loop where the controller 210 sets the broadcast communication device 201 in the receive mode for a random period of time in step 320, stores all received messages in the storage device 204 in step 322, transmits the outgoing message stored in the storage device 204 in step 324, and checks if enough copies of outgoing messages have been sent in step 326. If the number of copies the outgoing message been sent is greater than a pre-specified value, the controller 210 stops executing the collision handling procedure. Otherwise, the controller 210 loops back to step 320. The collision handling procedure 300 is based on the ALOHA protocol without sending positive acknowledgment for each received message. In the ALOHA protocol, the likelihood of successfully transmitting a message increases as the number of copies been sent increases provided that the mean value of the random period of time in step 320 is large enough.

Figure 4:
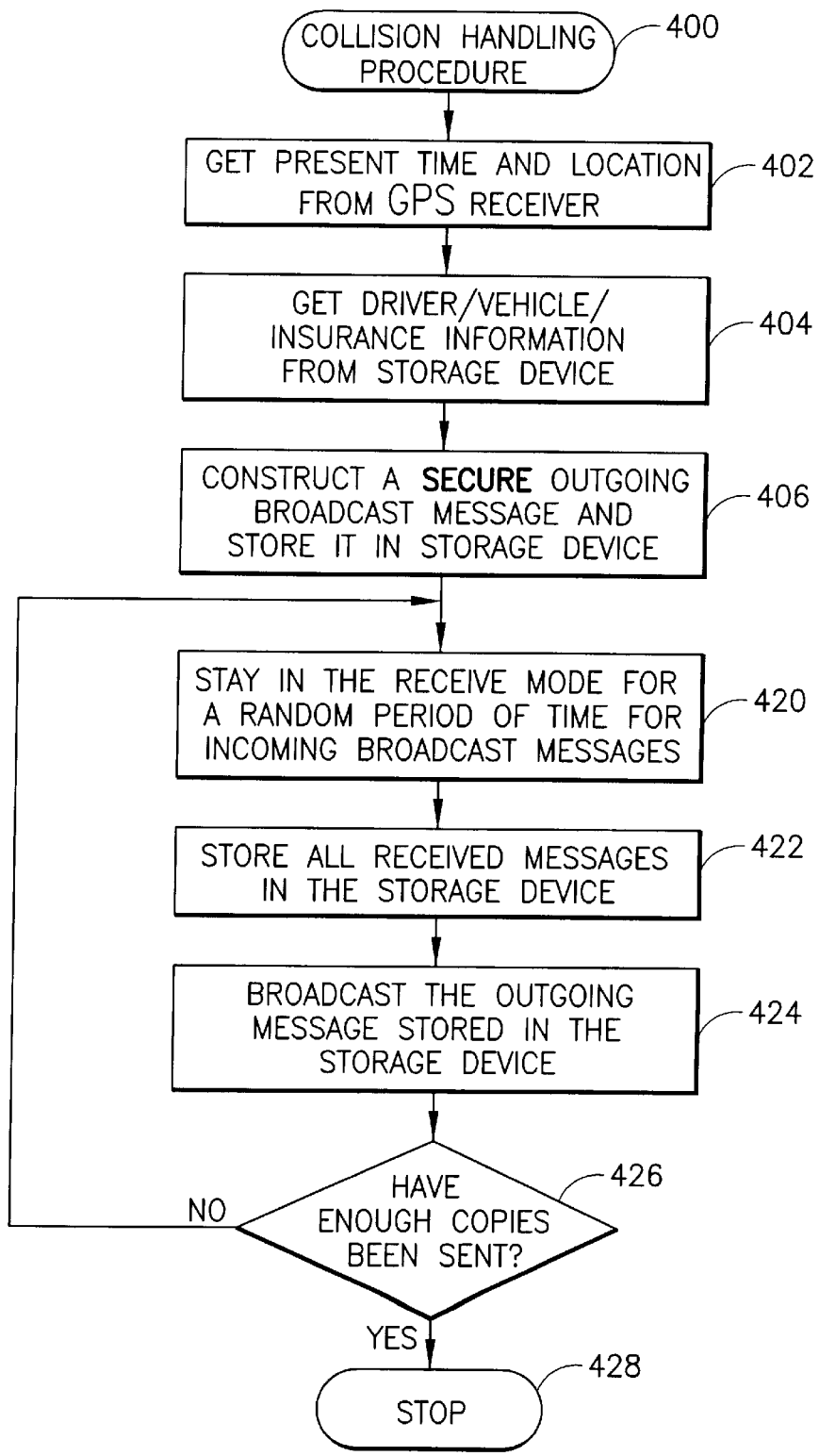
FIG. 4 is a flowchart for the alternative collision handling procedure executed by the controller when the collision sensor is triggered.

Note that the outgoing message constructed in step 306 is sent out in step 324 in clear text. Thus, it is not difficult for the receiver of the message to read and modify the received message. In fact, it is easy for a controller to forge a received message. To eliminate these drawbacks of the collision handling procedure described in FIG. 3, a flowchart of an alternative collision handling procedure is shown in FIG. 4, which is almost the same as FIG. 3 except for the step of constructing a secure outgoing message in step 406. Modern cryptographic techniques, such as public key cryptography and digital signature, can be applied to construct a secure outgoing message. For example, the outgoing message can be digitally signed by the private key of the driver automatically. That way, the receiving controller cannot forge a received message. Moreover, the outgoing message can be encrypted by the public key of a trusted third party, such as the police department, in step 406 so that the receiving controller cannot read the message without the intervention of a trusted third party.

References

[1] OnStar of General Motor, http://www.onstar.com/
[2] MP200-GPS of Sierra Wireless, http://www.sierrawireless.com/
[3] Placer GPS 450 of Trimble, http://www.trimble.com/
[4] Rocochet modem of Metricom, http://www.ricochet.com/
[5] U.S. Pat. No. 5,210,456, O. Suzuki, 1993.
[6] U.S. Pat. No. 5,684,701, D. S. Breed, 1997.
[7] U.S. Pat. No. 5,488,872, P. McCormick, 1996.
[8] Serial Port Complete: Programming and Circuits for RS-232 and RS-485 Links and Networks, by Jan Axelson, ISBN 0965081923.
[9] C Programming Guide to Serial Communications, by Joe Campbell, ISBN 0672302861.

References 1 through 9 above are hereby incorporated herein by reference.

Having thus described our invention, what we claim as new and desire to secure by Letters Patent is as follows:

1. A program storage device readable by a controller installed in a first vehicle, tangibly embodying a program of instructions executed by said controller to perform method steps for automatically exchanging information with other vehicles in the event of a collision, said method comprising:

sensing said collision by said first vehicle;

transmitting a signal to said controller indicating said collision;

upon reception of said signal by said controller, forming a message comprising an identification of said first vehicle;

transmitting said message to at least a second of said vehicles within a threshold distance of said first vehicle; and storing said first message in a memory of at least said second of said vehicles and receiving at least one witness message from at least one other of said vehicles indicating that the driver of said at least one other of said vehicles is a witness to said collision.

2. A method of automatically exchanging information between a plurality of vehicles some of which have collided with each other, said method comprising:

at least a first of said vehicles sensing said collision and forming a first message comprising said first vehicle's identification;

said first vehicle transmitting said first message to at least a second of said vehicles;

said second vehicle transmitting a second message in response to said first message, said second message indicating that the driver of said second vehicle is a witness to said collision; and said second message including the identification of said second vehicle.

3. A method of automatically exchanging information between a plurality of vehicles some of which have collided with each other, said method comprising:

receiving a first message from a second vehicle whose collision sensor is triggered;

transmitting a second message to said second vehicle, said second message comprising an identification of said first vehicle;

storing said first message in a memory of said first vehicle storing said second message in a memory of said second vehicle and;

at least one of said first and said second vehicles receiving at least one witness message from at least one third vehicle indicating that the driver of said at least one third vehicle is a witness to said collision.

4. An apparatus for automatically exchanging information between a plurality of vehicles some of which have collided with each other, said apparatus comprising:

a receiver for receiving a first message from a second vehicle whose collision sensor is triggered;

a transmitter for transmitting a second message to said second vehicle, said second message comprising an identification of said first vehicle;

a first storage device for storing said first message in a memory of said first vehicle;

a second storage device for storing said second message in a memory of said second vehicle; and wherein at least one of said first and said storage devices comprises at least one memory location for storing at least one witness message from at least one third vehicle indicating that the driver of said at least one third vehicle is a witness to said collision.

5. A program storage device readable by a controller installed in a first vehicle tangibly embodying a program of instructions executed by said controller to perform method steps for automatically exchanging information between a plurality of vehicles some of which have collided with each other, said method comprising the steps of:

receiving a first message from a second vehicle whose collision sensor is triggered;

transmitting a second message to said second vehicle, said second message comprising an identification of said first vehicle;

storing said first message in a memory of said first vehicle storing said second message in a memory of said second vehicle; and at least one of said first and said second vehicles receiving at least one witness message from at least one third vehicle indicating that the driver of said at least one third vehicle is a witness to said collision.

6. A method of automatically exchanging information among a plurality of vehicles some of which have collided with each other, said method comprising:

at least one of said vehicles sensing said collision and forming a message comprising its vehicle identification;

said one vehicle transmitting said message to at least one other of said vehicles;

storing said message in a memory of at least another of said vehicles; and said at least one of said vehicles receiving at least one witness message from at least one other of said vehicles indicating that the driver of said at least one other of said vehicles is a witness to said collision.

7. A method as recited in claim 6, wherein said message also comprises information on the time of collision.

8. A method as recited in claim 6, wherein said message comprises information on the location of said one vehicle.

9. A method as recited in claim 6, wherein said message comprises identification information on the owner of said one vehicle, and on the insurance company of said owner.

10. A method as recited in claim 6, wherein said message comprises information on the time and location of said collision, on the owner of at least said one vehicle, and on the insurance company of said owner.

11. A method as recited in claim 6, wherein said message is digitally signed.

12. A method as recited in claim 6, wherein said message is encrypted using a public key of a third party not involved in said collision.

13. An apparatus installed in a first vehicle for exchanging information with other vehicles, said apparatus comprising:

a sensor for sensing a collision;

a transmitter for transmitting a first message when said collision is sensed, said first message comprising the identification of said first vehicle in which said apparatus is installed;

a receiver for receiving additional messages transmitted by said other vehicles, at least one of said additional messages comprising an identification of at least one of said vehicles; and a memory for storing said additional messages wherein said memory comprises at least one memory location for storing at least one witness message from at least one other of said vehicles indicating that the driver of said at least one other of said vehicles is a witness to said collision.

14. An apparatus as recited in claim 13, wherein said sensor comprises one of at least the following:

an deacceleration detection device, a pressure sensor, and an inertia detection device.

15. An apparatus as recited in claim 13, wherein said transmitter transmits said message, which further comprises the time of collision.

16. An apparatus as recited in claim 13, wherein said transmitter transmits said message, which further comprises the identification of the owner of said first vehicle and the identification of the insurance company of said owner.

17. An apparatus as recited in claim 13, further comprising:

an encryption device for digitally signing said message.

18. An apparatus as recited in claim 13, further comprising:

an encryption device for encrypting said message with a public key of a third party.

* * * * *